United States Patent
Yaginuma et al.

(10) Patent No.: US 6,890,662 B2
(45) Date of Patent: May 10, 2005

(54) ANTI-TRACKING SILICONE RUBBER COMPOSITION AND POWER CABLE USING THE SAME

(75) Inventors: Atsushi Yaginuma, Gunma-ken (JP); Yoshiaki Koike, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 17 days.

(21) Appl. No.: 10/461,446

(22) Filed: Jun. 16, 2003

(65) Prior Publication Data

US 2003/0232202 A1 Dec. 18, 2003

(30) Foreign Application Priority Data

Jun. 18, 2002 (JP) ........................................ 2002-176568

(51) Int. Cl.⁷ ........................... B32B 27/00; H01B 9/00; C08L 83/04
(52) U.S. Cl. ....................... 428/447; 174/68.1; 524/860; 524/866
(58) Field of Search ................................. 524/858, 860, 524/863, 864, 865, 866, 868, 869; 528/10, 12, 15, 21, 22, 32, 33, 34, 35, 38; 428/446, 447, 448, 450, 332, 34.1, 35.7, 36.9; 174/68.1

(56) References Cited

U.S. PATENT DOCUMENTS

| | | | |
|---|---|---|---|
| 4,678,827 A | | 7/1987 | Itoh et al. |
| 5,369,161 A | | 11/1994 | Kunieda et al. |
| 5,922,426 A | * | 7/1999 | Nagatsuka et al. ...... 428/36.92 |
| 5,942,571 A | | 8/1999 | Nakamura et al. |
| 6,011,105 A | | 1/2000 | Ota et al. |
| 6,043,309 A | | 3/2000 | Nakamura et al. |

FOREIGN PATENT DOCUMENTS

| | | |
|---|---|---|
| JP | 61-228062 A | 10/1986 |
| JP | 9-284977 A | 10/1997 |

* cited by examiner

*Primary Examiner*—Michael J. Feely
(74) *Attorney, Agent, or Firm*—Birch, Stewart, Kolasch & Birch, LLP

(57) ABSTRACT

A silicone rubber composition comprising an organopolysiloxane component composed of (A) an organopolysiloxane gum having an alkenyl content of 0.001–2 mol % and (B) an organopolysiloxane gum having an alkenyl content of more than 2 mol % to 20 mol %, (C) microparticulate silica, (D) platinum or a platinum compound, (E) an organosilicon compound containing a nitrogenous organic group and an unsaturated hydrocarbon group and/or a benzotriazole, and (F) a curing agent cures into electrically insulating silicone rubber having a minimized tensile permanent set, improved mechanical strength, and tracking resistance.

5 Claims, No Drawings

ANTI-TRACKING SILICONE RUBBER COMPOSITION AND POWER CABLE USING THE SAME

This invention relates to silicone rubber compositions for forming electrically insulating silicone rubber used in power cable connections such as intermediate connections between power cables and terminations between power cable terminals and terminal fittings, and power cables using the same. More particularly, it relates to anti-tracking silicone rubber compositions which cure into products having improved mechanical strength and high-voltage electrical insulation, and power cables using the same.

BACKGROUND OF THE INVENTION

Electrically insulating members, especially electrically insulating enclosures, used in power cable connections such as intermediate connections between power cables and terminations between power cable terminals and terminal fittings are often made of elastic rubbers having good electrical insulation such as silicone rubbers and EP rubbers.

Three different methods are generally used for the connection of power cables. A first method uses an insulating enclosure which is slidably moved over the sheath of a power cable to a connection between power cables to form a joint structure. A second method uses a once rolled-up enclosure which is unwrapped over a connection to form a joint structure. In a third method, a core dilator is previously inserted inside an insulating enclosure to keep the enclosure in the dilated state, the core dilator with the dilated enclosure fitted thereon is moved to a connection between power cables, and the core dilator is then drawn out whereupon the enclosure shrinks and fits in place to form a joint structure. The shrinkage of the enclosure occurs at room temperature. Of these methods, the third method or enclosure shrinkage fit method is preferred for operation efficiency.

In particular, the rubber material of which the enclosures of room temperature shrinkage type are made must be readily dilatable, be minimized in tensile permanent set which is a measure of restoration after removal of the core dilator, and have high tensile strength, high tear strength and excellent tracking resistance which is a measure of electrical insulation. The required physical properties of rubber include, for instance, a tensile strength of at least 8 MPa, a tear strength of at least 25 N/mm, an elongation at break of at least 600%, a tensile permanent set (JIS K6249) of up to 20 under conditions: 180° C., 22 hours and 100% elongation, which are regarded as the target values.

When a comparison is made between silicone rubber and ethylene-propylene (EP) rubber, the silicone rubber has a better restoring ability on account of a lower tensile permanent set so that after removal of the core dilator, an enclosure thereof establishes a better seal and closer contact to the cable or the like. Another advantage is that the silicone rubber can be formulated into a higher elongation material which is easy to dilate.

The silicone rubber, however, suffers from a problem that on outdoor use, the silicone rubber is susceptible to tracking by leakage current and is degraded thereby. To improve tracking resistance to form satisfactory electrically insulating silicone rubber, the silicone rubber must be heavily loaded with aluminum hydroxide, which undesirably degrades the mechanical strength of rubber, below the target rubber physical properties described above.

JP-A 61-228062 describes a flame retardant silicone rubber composition comprising an organosilicon compound having a nitrogenous organic group and an unsaturated group and a platinum compound. This composition has improved flame retardance, but lacks some properties like mechanical strength and is thus unsuitable for power cable connection. JP-A 9-284977 describes an enclosure for power cable connection made of a silicone rubber composition comprising aluminum hydroxide, benzotriazole and a platinum compound. Because of essential inclusion of aluminum hydroxide, this composition has poor mechanical strength.

SUMMARY OF THE INVENTION

An object of the present invention is to provide an anti-tracking silicone rubber composition which cures into a product having a minimized tensile permanent set, improved mechanical strength (tensile strength and tear strength), and improved high-voltage electrical insulation; and a power cable using the same.

It has been found that a silicone rubber composition comprising an organopolysiloxane component composed of (A) an organopolysiloxane gum having an alkenyl content of 0.001 mol % to 2 mol % and (B) an organopolysiloxane gum having an alkenyl content of more than 2 mol % to 20 mol % in a suitable proportion, (C) microparticulate silica, (D) platinum or a platinum compound, (E) an organosilicon compound containing a nitrogenous organic group and an unsaturated hydrocarbon group and/or a benzotriazole, and (F) a curing agent cures into a product having improved tracking resistance although the composition is not filled with aluminum hydroxide. The addition of a specific silicone oil to the composition further improves the tracking resistance. The above-discussed problems are overcome in this way.

Accordingly, the present invention provides an anti-tracking silicone rubber composition comprising (A) 60 to 99 parts by weight of an organopolysiloxane gum having an alkenyl content of 0.001 mol % to 2 mol %, (B) an organopolysiloxane gum having an alkenyl content of more than 2 mol % to 20 mol %, the amount of components (A) and (B) combined being 100 parts by weight, (C) 5 to 100 parts by weight of microparticulate silica having a specific surface area of at least 50 m$^2$/g, (D) platinum or a platinum compound in an amount to give 1 to 1,000 ppm of platinum atoms based on the total weight of components (A) and (B), (E) 0.01 to 5 parts by weight of an organosilicon compound containing a nitrogenous organic group and an unsaturated hydrocarbon group and/or a benzotriazole, and (F) a curing agent in an amount sufficient to cure the composition.

DESCRIPTION OF THE PREFERRED EMBODIMENTS

Briefly stated, the anti-tracking silicone rubber composition of the invention comprises (A) an organopolysiloxane gum having an alkenyl content of 0.001 mol % to 2 mol %, (B) an organopolysiloxane gum having an alkenyl content of more than 2 mol % to 20 mol %, (C) microparticulate silica having a specific surface area of at least 50 m$^2$/g, (D) platinum or a platinum compound, (E) an organosilicon compound containing a nitrogenous organic group and an unsaturated hydrocarbon group and/or a benzotriazole, and (F) a curing agent.

In the anti-tracking silicone rubber composition of the invention, components (A) and (B) are organopolysiloxanes having the average compositional formula (1):

$$R^1_a SiO_{(4-a)/2} \quad (1)$$

wherein $R^1$ is a substituted or unsubstituted monovalent hydrocarbon group and "a" is a positive number of 1.95 to 2.04. Component (A) is an organopolysiloxane of formula (1) wherein 0.001 mol % to 2 mol %, especially 0.001 mol % to 1 mol % of $R^1$ are alkenyl groups, and component (B) is an organopolysiloxane of formula (1) wherein more than 2 mol % to 20 mol %, especially more than 2 mol % to 10 mol % of $R^1$ are alkenyl groups. Examples of suitable alkenyl groups include vinyl, allyl, butenyl and hexenyl, with vinyl being most preferred. The alkenyl groups may be positioned at ends or on side chains of the molecular chain or both.

The groups represented by $R^1$ other than alkenyl, which may be the same or different, include substituted or unsubstituted monovalent hydrocarbon groups, preferably having 1 to 12 carbon atoms, more preferably 1 to 8 carbon atoms, for example, alkyl groups such as methyl, ethyl, propyl, butyl, hexyl and dodecyl, cycloalkyl groups such as cyclohexyl, aryl groups such as phenyl and tolyl, aralkyl groups such as β-phenylpropyl, and substituted ones of the foregoing groups in which some or all of the hydrogen atoms attached to carbon atoms are substituted with halogen atoms, cyano groups or the like, such as chloromethyl, trifluoropropyl and cyanoethyl. For both components (A) and (B), it is preferred that at least 80 mol %, especially at least 90 mol % of $R^1$ other than alkenyl be methyl.

The subscript "a" is a positive number of 1.95 to 2.04, preferably 1.97 to 2.02. The organopolysiloxanes may be capped at an end of the molecular chain with a trimethylsilyl, dimethylvinyl, dimethylhydroxysilyl, trivinylsilyl or similar group. End-capping with a triorganosilyl group is preferred, and end-capping with an alkenyl-containing silyl group is especially preferred.

The amounts of organopolysiloxanes (A) and (B) are such that a total amount of 100 parts by weight is reached by combining 60 to 99 parts by weight, especially 90 to 99 parts by weight of organopolysiloxane (A) with the balance of organopolysiloxane (B). A combination of components (A) and (B) in this range ensures that the composition in the cured state has improved rubber physical properties, especially tear strength.

These organopolysiloxanes can be prepared by subjecting one or more organohalogenosilanes to co-hydrolytic condensation or by subjecting a cyclic polysiloxane (e.g., siloxane trimer or tetramer) to ring-opening polymerization in the presence of an alkaline or acidic catalyst. They are basically linear diorganopolysiloxanes although they may be partially branched. A mixture of two or more different molecular structures is acceptable. The organopolysiloxanes are gum-like, as demonstrated by a degree of polymerization of at least 3,000, with the upper limit being desirably about 100,000. The preferred degree of polymerization is about 5,000 to about 20,000.

Component (C) in the anti-tracking silicone rubber composition of the invention is microparticulate silica which is essential for the cured silicone rubber to have improved mechanical strength. To this end, the microparticulate silica should have a specific surface area of at least 50 m²/g, preferably 100 to 400 m²/g. Examples of microparticulate silica include fumed silica (dry silica) and precipitated silica (wet silica), with fumed silica being preferred. Most preferred is fumed silica which has been made hydrophobic through surface treatment with an organosilicon compound (e.g., organopolysiloxane, organopolysilazane, chlorosilane and alkoxysilane). These silicas may be used alone or in admixture of two or more.

The amount of microparticulate silica (C) compounded is 5 to 100 parts by weight, preferably 10 to 90 parts by weight, more preferably 30 to 80 parts by weight per 100 parts by weight of organopolysiloxanes (A) and (B) combined. Less than 5 parts of silica is too small to achieve reinforcement whereas more than 100 parts interferes with processing and adversely affects the physical properties of cured silicone rubber.

Components (D) and (E) are compounded in the anti-tracking silicone rubber composition of the invention in order to achieve the synergistic effect of improving tracking resistance. Specifically, component (D) is platinum or a platinum compound and effective for improving the flame retardance of silicone rubber, and component (E) is an organosilicon compound containing a nitrogenous organic group and an unsaturated hydrocarbon group and/or a benzotriazole and is effective for improving tracking resistance. Since the addition of component (E) does have no deleterious impact on the cured physical properties, a cured product having improved mechanical strength is obtainable.

Examples of platinum or platinum compound (D) include elemental platinum, microparticulate platinum adsorbed on carriers such as silica, alumina and silica gel, platinum composites, platinic chloride, chloroplatinic acid, complexes of chloroplatinic acid hexahydrate with divinyldimethylpolysiloxane, and alcohol solutions of chloroplatinic acid hexahydrate, as well as complexes of chloroplatinic acid hexahydrate with aldehyde compounds, ether compounds or olefins. The amount of platinum or platinum compound (D) compounded is about 1 to 1,000 ppm, preferably about 5 to 500 ppm of platinum atoms based on the total weight of organopolysiloxanes (A) and (B) combined.

Component (E) is an organosilicon compound containing a nitrogenous organic group and an unsaturated hydrocarbon group and/or a benzotriazole. The organosilicon compound used herein should contain a nitrogenous organic group such as an aminoalkyl or imino group and an unsaturated hydrocarbon group such as an alkenyl group in the same molecule. Illustrative examples include organosilanes containing an aminoalkyl group (preferably of 1 to 3 carbon atoms) or imino group and an alkenyl group (preferably vinyl) in the same molecule, such as the organosilanes shown below, and siloxanes resulting from hydrolysis of these organosilanes.

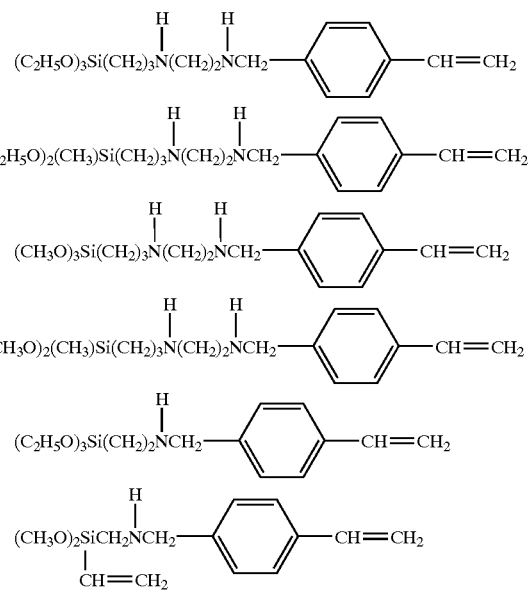

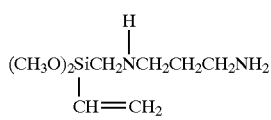

Other useful examples of the organosilicon compound include siloxanes resulting from co-hydrolysis of a first silane containing a nitrogenous organic group such as an aminoalkyl group (preferably of 1 to 3 carbon atoms) or imino group and a second silane containing an unsaturated hydrocarbon group such as an alkenyl group (preferably vinyl, propenyl); and siloxanes resulting from co-hydrolysis of the first silane containing a nitrogenous organic group, the second silane containing an unsaturated hydrocarbon group and a third silane free of such groups. Illustrative examples of these siloxanes are shown below.

Herein, m is an integer of at least 1, preferably 1 to 30, n is an integer of at least 1, preferably 1 to 50, p is an integer of at least 1, preferably 1 to 500, and q is an integer of at least 2, preferably 3 to 10.

Examples of suitable benzotriazoles include benzotriazole, 1-methylbenzotriazole, 5,6-dimethyl-benzotriazole, 2-phenylbenzotriazole, 1-hydroxybenzotriazole, and methyl benzotriazole-1-carboxylate. If a benzotriazole is solid at room temperature, it may be used in the form of a solution such as alcohol solution or a paste such as silicone oil paste or silicone gum paste in order to facilitate the dispersion thereof in the composition.

An appropriate amount of the organosilicon compound and/or benzotriazole (E) (the total amount of organosilicon compound and benzotriazole when both are compounded) is 0.01 to 5 parts by weight, preferably 0.1 to 2 parts by weight per 100 parts by weight of organopolysiloxanes (A) and (B) combined. Less than 0.01 part of component (E) is ineffective whereas more than 5 parts achieves no further improvement and can rather inhibit vulcanization.

In the anti-tracking silicone rubber composition of the invention, well-known organohydrogenpolysiloxane/

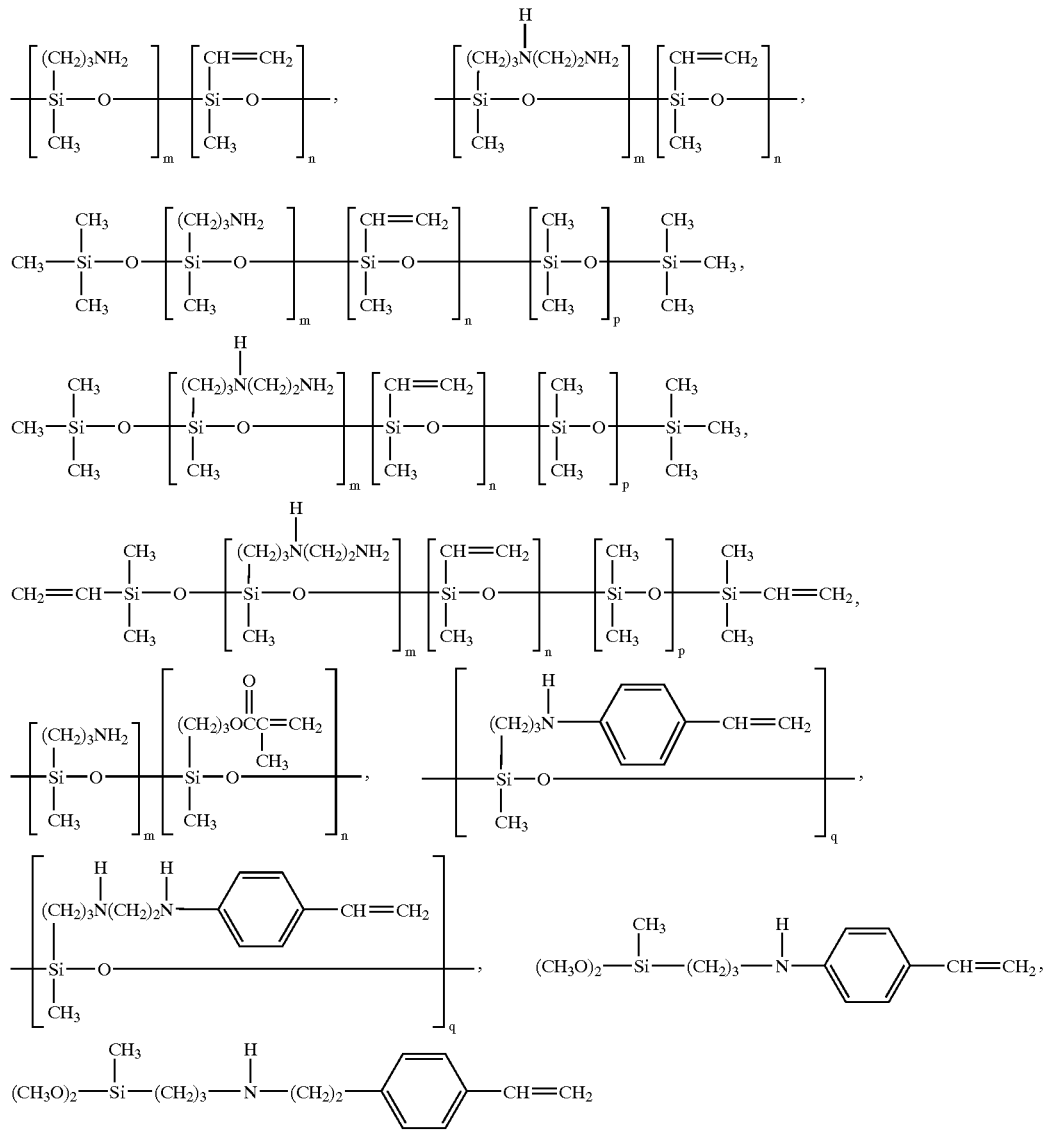

platinum group catalysts (addition reaction curing agents) or organic peroxide catalysts may be used as the curing agent (F).

In the embodiment wherein organohydrogenpolysiloxane/ platinum group catalysts are used as the curing agent, the organohydrogenpolysiloxane is preferably of the following average composition formula:

wherein R is a substituted or unsubstituted monovalent hydrocarbon group, b and c are numbers satisfying $0<b\leq3$, $0\leq c<3$, and $0<b+c\leq3$. The organohydrogenpolysiloxane may be linear, branched or cyclic as long as it has at least two SiH groups in the molecule. Preferably the organohydrogenpolysiloxane has a degree of polymerization of up to 300. Examples include diorganopolysiloxane end-blocked with a dimethylhydrogensilyl group, copolymers of dimethylsiloxane, methylhydrogensiloxane and terminal trimethylsiloxy units, low viscosity fluids consisting essentially of dimethylhydrogensiloxane ($H(CH_3)_2SiO_{1/2}$) units and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane. Desirably the organohydrogenpolysiloxane is added as the curing agent in such proportion that the hydrogen atoms directly attached to silicon atoms (i.e., SiH groups) therein amount to 50 to 500 mol % based on the total of alkenyl groups on organopolysiloxanes (A) and (B).

On the other hand, for the platinum group catalyst, the above-described component (C) can be a substitute. If necessary, the platinum group catalyst, which is selected from well-known ones, for example, elemental platinum alone, platinum composites, chloroplatinic acid, and complexes of chloroplatinic acid with alcohols, aldehydes, ethers and olefins, is added as a curing co-agent in such amounts as to give 1 to 2,000 ppm, especially 5 to 1,000 ppm of platinum atoms, as the total of the curing co-agent and component (C), based on the total weight of organopolysiloxanes (A) and (B).

Examples of the organic peroxide catalyst include benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)-hexane, di-t-butyl peroxide, and t-butyl perbenzoate. An appropriate amount of the organic peroxide added is 0.1 to 5 parts by weight per 100 parts by weight of organopolysiloxanes (A) and (B) combined.

In addition to the foregoing components, the anti-tracking silicone rubber composition of the invention may further contain (G) a phenyl group-containing silicone oil for further improving resistance to tracking. The phenyl-containing silicone oil is preferably of the general formula (2):

(2)

wherein $R^2$ is independently a substituted or unsubstituted monovalent hydrocarbon group of 1 to 8 carbon atoms, at least 3 mol % of $R^2$ are phenyl, $R^3$ is independently a hydroxyl group or a substituted or unsubstituted monovalent hydrocarbon group of 1 to 8 carbon atoms, and d is an integer of at least 3.

Examples of $R^2$ include alkyl groups such as methyl, ethyl, propyl, butyl and hexyl, cycloalkyl groups such as cyclohexyl, aryl groups such as phenyl and tolyl, and aralkyl groups such as benzyl, in which some or all of the hydrogen atoms may be substituted with halogen atoms or the like. Of these, methyl and phenyl groups are preferred. At least 3 mol %, preferably 10 mol % to 40 mol % of $R^2$ groups should be phenyl. If phenyl groups account for less than 3 mol % of $R^2$, the silicone oil is less effective for tracking resistance enhancement and must be added more, tending to detract from rubber strength. Examples of the substituted or unsubstituted monovalent $C_{1-8}$ hydrocarbon group represented by $R^3$ are the same as exemplified above for $R^2$. Methyl and hydroxyl groups are preferred as $R^3$.

The phenyl group-containing silicone oil of formula (2) should preferably have a viscosity at 25° C. of about 50 to about 1,000 centistokes (cs), more preferably about 100 to 500 cs. If the viscosity of the silicone oil is less than 50 cs, the silicone rubber composition may have a low degree of plasticity and become awkward to process. With a viscosity of more than 1,000 cs, the silicone oil is less effective for tracking resistance enhancement and must be added more, tending to detract from rubber strength.

An appropriate amount of the phenyl group-containing silicone oil (G) is 0.01 to 5 parts by weight, more preferably 0.1 to 2 parts by weight per 100 parts by weight of organopolysiloxanes (A) and (B) combined. Outside the range, a smaller amount may fail to achieve the addition effect whereas a larger amount may bleed out, causing stains on the cured rubber surface.

If desired, various additives which are incorporated in conventional silicone rubber compositions may be added to the anti-tracking silicone rubber composition of the invention as long as they do not compromise the objects of the invention. Suitable additives include, but are not limited to, hydroxyl-terminated diorganopolysiloxanes such as dimethylpolysiloxane and methylvinylpolysiloxane, known as "wetter," low-molecular-weight organosilicon compounds such as diphenylsilane diol, hexamethyl disilazane and organoalkoxysilanes, water, inorganic fillers such as diatomaceous earth, quartz flour, calcium carbonate, aluminum hydroxide and carbon black, heat resistance modifiers such as cerium hydroxide, cerium silanolate and cerium fatty acid salts, mold release agents, for instance, fatty acids and metal salts thereof such as stearic acid, zinc stearate and calcium stearate, and waxes, metal oxides such as iron oxide and titanium oxide, and pigments.

The anti-tracking silicone rubber composition of the invention can be obtained by intimately mixing the essential and optional components in a rubber kneading machine such as a twin-roll mill, Banbury mixer and dough mixer (kneader).

Then the anti-tracking silicone rubber composition of the invention is heat vulcanized into a cured silicone rubber. The methods of molding and curing the rubber composition may be selected as appropriate. For example, the composition can be molded by any of compression molding, transfer molding, extrusion molding, injection molding and calender molding methods. An appropriate curing method may be selected in accordance with the type of curing agent.

EXAMPLE

Examples of the invention are given below by way of illustration, but not by way of limitation.

Measurement of Cured Properties

Mechanical properties: hardness, tensile strength, tear strength, elongation at break and tensile permanent set Each silicone rubber composition was compression molded under heating conditions of 165° C. and 10 minutes into a silicone rubber sheet of 2 mm thick and post-cured (secondary vulcanization) at 200° C. for 4 hours. The silicone rubber sheet was measured for mechanical properties in accordance with the method of JIS K-6249.

Tracking Test

A tracking test was conducted in accordance with Method 1 stipulated in IEC Publication 587. A silicone rubber sheet of 6 mm thick prepared as above for the measurement of mechanical properties was used. Under an applied voltage of 3.5 kV or 4.5 kV and an electrode-to-electrode distance of 50 mm, the sheet was kept for 6 hours while drops of contaminant (aqueous solution containing 0.1% $NH_4Cl$ and 0.02% nonionic surfactant) fell from the top electrode at a rate of 0.6 ml/min. The specimen on which tracking occurred to induce conduction or penetration (breakdown) failed the test whereas the specimen on which no tracking occurred passed the test.

Example 1

On a kneader, 95 parts by weight of an organopolysiloxane consisting of 99.975 mol % dimethylsiloxane units and 0.025 mol % dimethylvinylsiloxane units and having an average degree of polymerization of about 8,000, 5 parts by weight of an organopolysiloxane consisting of 89.993 mol % dimethylsiloxane units, 9.982 mol % methylvinylsiloxane units and 0.025 mol % dimethylvinylsiloxane units and having an average degree of polymerization of about 8,000, 40 parts by weight of fumed silica having a specific surface area of 200 $m^2/g$ (Aerosil 200 by Nippon Aerosil Co., Ltd.), 5 parts by weight of hexamethyldisilazane as a dispersant, and 1 part by weight of water were mixed. The mixture was further combined with 1.0 part by weight of an organopolysiloxane of formula (3) shown below, designated Polymer A, hereinafter, and heat treated at 180° C. for 3 hours, yielding Compound A.

On a twin-roll mill, 100 parts by weight of Compound A was compounded with 0.1 part by weight of a 2-ethylhexanol solution of chloroplatinic acid hexahydrate (platinum concentration 2 wt %), 1.0 part by weight of iron oxide, 5.0 parts by weight of titanium oxide and 0.5 part by weight of cerium oxide. Further, 0.6 part by weight of dicumyl peroxide as a curing agent was incorporated on the twin-roll mill, yielding a silicone rubber composition SRC1.

From this composition SRC1, a cured rubber sheet specimen was prepared by the aforementioned procedure. The measured properties of the cured specimen are shown in Table 1.

Example 2

On a kneader, 95 parts by weight of an organopolysiloxane consisting of 99.975 mol % dimethylsiloxane units and 0.025 mol % dimethylvinylsiloxane units and having an average degree of polymerization of about 8,000, 5 parts by weight of an organopolysiloxane consisting of 89.993 mol % dimethylsiloxane units, 9.982 mol % methylvinylsiloxane units and 0.025 mol % dimethylvinylsiloxane units and having an average degree of polymerization of about 8,000, 35 parts by weight of fumed silica having a specific surface area of 300 $m^2/g$ which had been made hydrophobic through treatment with dichlorodimethylsilane, and 3 parts by weight of a silanol-terminated dimethylpolysiloxane having an average degree of polymerization of 13 and a viscosity of 15 cs at 25° C. as a dispersant were mixed. The mixture was further combined with 1.0 part by weight of Polymer A and heat treated at 180° C. for 3 hours, yielding Compound B.

On a twin-roll mill, 100 parts by weight of Compound B was compounded with 0.1 part by weight of a 2-ethylhexanol solution of chloroplatinic acid hexahydrate (platinum concentration 2 wt %), 1.0 part by weight of iron oxide, 5.0 parts by weight of titanium oxide and 0.5 part by weight of cerium oxide. Further, 0.6 part by weight of dicumyl peroxide as a curing agent was incorporated on the twin-roll mill, yielding a silicone rubber composition SRC2.

From this composition SRC2, a cured rubber sheet specimen was prepared by the aforementioned procedure. The measured properties of the cured specimen are shown in Table 1.

Example 3

On a twin-roll mill, 100 parts by weight of Compound B (prepared in Example 2) was compounded with 0.1 part by weight of a 2-ethylhexanol solution of chloroplatinic acid hexahydrate (platinum concentration 2 wt %), 1.0 part by weight of iron oxide, 5.0 parts by weight of titanium oxide, 0.5 part by weight of cerium oxide and 1 part by weight of a trimethylsiloxy-terminated silicone oil consisting of 75 mol % dimethylsiloxane units and 25 mol % diphenylsiloxane units and having a viscosity of 400 cs. Further, 0.6 part by weight of dicumyl peroxide as a curing agent was incorporated on the twin-roll mill, yielding a silicone rubber composition SRC3.

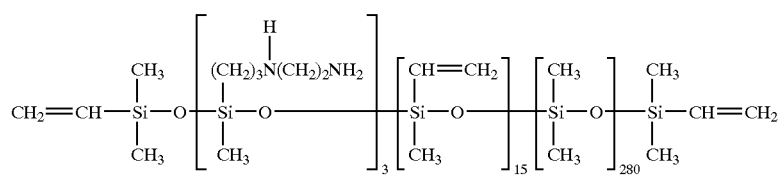

(3)

From this composition SRC3, a cured rubber sheet specimen was similarly prepared. The measured properties of the cured specimen are shown in Table 1.

Example 4

On a twin-roll mill, 100 parts by weight of Compound B (prepared in Example 2) was compounded with 0.1 part by weight of a 2-ethylhexanol solution of chloroplatinic acid hexahydrate (platinum concentration 2 wt %), 1.0 part by weight of iron oxide, 5.0 parts by weight of titanium oxide, 0.5 part by weight of cerium oxide and 0.01 part by weight of benzotriazole. Further, 0.6 part by weight of dicumyl peroxide as a curing agent was incorporated on the twin-roll mill, yielding a silicone rubber composition SRC6.

From this composition SRC6, a cured rubber sheet specimen was similarly prepared. The measured properties of the cured specimen are shown in Table 1.

Example 5

Like Compound B in Example 2, Compound C was prepared by the same procedure as in Example 2 except that Polymer A was omitted. On a twin-roll mill, 100 parts by weight of Compound C was compounded with 0.1 part by weight of a 2-ethylhexanol solution of chloroplatinic acid hexahydrate (platinum concentration 2 wt %), 1.0 part by weight of iron oxide, 5.0 parts by weight of titanium oxide, 0.5 part by weight of cerium oxide and 0.02 part by weight of benzotriazole. Further, 0.6 part by weight of dicumyl peroxide as a curing agent was incorporated on the twin-roll mill, yielding a silicone rubber composition SRC7.

From this composition SRC7, a cured rubber sheet specimen was similarly prepared. The measured properties of the cured specimen are shown in Table 1.

Comparative Example 1

A silicone rubber composition SRC4 was prepared by the same procedure as in Example 1 except that Polymer A was omitted during the preparation of Compound A in Example 1.

From this composition SRC4, a cured rubber sheet specimen was similarly prepared. The measured properties of the cured specimen are shown in Table 1.

Comparative Example 2

A silicone rubber composition SRC5 was prepared by the same procedure as in Example 1 except that 50 parts by weight of aluminum hydroxide was compounded instead of Polymer A during the preparation of Compound A in Example 1.

From this composition SRC5, a cured rubber sheet specimen was similarly prepared. The measured properties of the cured specimen are shown in Table 1.

Comparative Example 3

A silicone rubber composition SRC8 was prepared by the same procedure as in Example 1 except that 100 parts by weight of the organopolysiloxane consisting of 99.975 mol % dimethylsiloxane units and 0.025 mol % dimethylvinylsiloxane units and having an average degree of polymerization of about 8,000 was used, and the organopolysiloxane consisting of 89.993 mol % dimethylsiloxane units, 9.982 mol % methylvinylsiloxane units and 0.025 mol % dimethylvinylsiloxane units and having an average degree of polymerization of about 8,000 was omitted.

From this composition SRC8, a cured rubber sheet specimen was similarly prepared. The measured properties of the cured specimen are shown in Table 1.

TABLE 1

|  |  | Example | | | | | Comparative Example | | |
|---|---|---|---|---|---|---|---|---|---|
|  |  | 1 | 2 | 3 | 4 | 5 | 1 | 2 | 3 |
|  | Silicone rubber composition | SRC1 | SRC2 | SRC3 | SRC6 | SRC7 | SRC4 | SRC5 | SRC8 |
| Mechanical properties | Hardness, Durometer A | 40 | 53 | 52 | 53 | 51 | 51 | 56 | 36 |
|  | Tensile strength, MPa | 9.5 | 9.0 | 9.4 | 9.1 | 8.9 | 9.4 | 7.2 | 8.6 |
|  | Elongation at break, % | 620 | 680 | 700 | 700 | 670 | 600 | 350 | 540 |
|  | Tear strength (crescent), kN/m | 30 | 34 | 35 | 35 | 33 | 30 | 18 | 12 |
|  | Tensile permanent set, % | 18 | 8 | 8 | 11 | 10 | 20 | 30 | 10 |
| Tracking test | Test voltage 3.5 kV | Pass | Pass | Pass | Pass | Pass | Fail | Pass | Pass |
|  | Test voltage 4.5 V | Fail | Fail | Pass | Fail | Fail | Fail | Fail | Fail |

There have been described silicone rubber compositions which cure into electrically insulating silicone rubbers having a minimized tensile permanent set, improved mechanical strength including tensile strength and tear strength, and tracking resistance.

Japanese Patent Application No. 2002-176568 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An anti-tracking silicone rubber composition comprising
   (A) 60 to 99 parts by weight of an organopolysiloxane gum having an alkenyl content of 0.001 mol % to 2 mol %,
   (B) an organopolysiloxane gum having an alkenyl content of more than 2 mol % to 20 mol %, the amount of components (A) and (B) combined being 100 parts by weight,
   (C) 5 to 100 parts by weight of microparticulate silica having a specific surface area of at least 50 m²/g,
   (D) platinum or a platinum compound in an amount to give 1 to 1,000 ppm of platinum atoms based on the total weight of components (A) and (B),
   (E) 0.01 to 5 parts by weight of an organosilicon compound containing a nitrogenous organic group and an unsaturated hydrocarbon group and/or a benzotriazole,
   (F) a curing agent in an amount sufficient to cure the composition, and
   (G) 0.01 to 5 parts by weight of a phenyl group-containing silicone oil.

2. The composition of claim 1 which cures into a product having a tensile strength of at least 8 MPa, a tear strength of at least 25 N/mm, and an elongation at break of at least 600%.

3. The composition of claim 1 which is used in power cable connections.

4. A power cable connected with the aid of an anti-tracking silicone rubber composition in the cured state, said anti-tracking silicone rubber composition comprising:

(A) 60 to 99 parts by weight of an organopolysiloxane gum having an alkenyl content of 0.001 mol % to 2 mol %;

(B) an organopolysiloxane siloxane gum having an alkenyl content of more than 2 mol % to 20 mol %, the amount of components (A) and (B) combined being 100 parts by weight;

(C) 5 to 100 parts by weight of microparticulate silica having a specific surface area of at least 50 m$^2$/g;

(D) platinum or a platinum compound in an amount that provides 1 to 1000 ppm of platinum atoms based on the total weight of components (A) and (B);

(E) 0.01 to 5 parts by weight of an organosilicon compound containing a nitrogenous organic group and an unsaturated hydrocarbon group and/or a benzotriazole; and (F) a curing agent in an amount sufficient to cure the composition.

5. The power cable of claim 4, wherein the composition further comprises (G) 0.01 to 5 parts by weight of a phenyl group-containing silicone oil.

* * * * *